(12) United States Patent
Will

(10) Patent No.: US 10,218,294 B2
(45) Date of Patent: Feb. 26, 2019

(54) BEARING, IN PARTICULAR FOR A MAGNETIC LEVITATION ASSEMBLY

(71) Applicant: RUBOTHERM GMBH, Bochum (DE)

(72) Inventor: Cornelia Will, Bochum (DE)

( * ) Notice: Subject to any disclaimer, the term of this patent is extended or adjusted under 35 U.S.C. 154(b) by 0 days.

(21) Appl. No.: 15/763,554

(22) PCT Filed: Sep. 30, 2016

(86) PCT No.: PCT/EP2016/073453
§ 371 (c)(1),
(2) Date: Mar. 27, 2018

(87) PCT Pub. No.: WO2017/055571
PCT Pub. Date: Apr. 6, 2017

(65) Prior Publication Data
US 2018/0287518 A1    Oct. 4, 2018

(30) Foreign Application Priority Data

Oct. 2, 2015 (DE) .......... 10 2015 116 767

(51) Int. Cl.
*H02K 7/09* (2006.01)
*H02N 15/00* (2006.01)
(Continued)

(52) U.S. Cl.
CPC ......... *H02N 15/00* (2013.01); *F16C 32/0408* (2013.01); *F16C 32/048* (2013.01);
(Continued)

(58) Field of Classification Search
CPC ......... F16C 32/04; F16C 32/048; G01G 7/04; H02K 7/09; H02N 15/00
(Continued)

(56) References Cited

U.S. PATENT DOCUMENTS 5,726,512 A * 3/1998 Chu ............... F16C 32/0438
310/90.5
2006/0162452 A1   7/2006 Moser et al.
2008/0122308 A1   5/2008 Mleux

FOREIGN PATENT DOCUMENTS

WO    2007065608 A1    6/2007
WO    WO 2007065608 A1 * 6/2007 .............. F16C 32/04

OTHER PUBLICATIONS

International Search Report & Written Opinion in PCT/EP2016/073453, dated Feb. 6, 2017; 15 pages.

* cited by examiner

Primary Examiner — Naishadh Desai

(57) ABSTRACT

A magnetic bearing assembly (20) comprises a first magnet assembly (34) for generating a first quadrupole magnetic field in a first plane and a second magnet assembly (36) for generating a second quadrupole magnetic field in a second plane. The second plane is arranged parallel to the first plane. The quadrupole magnetic fields exhibit in each case in the planes magnetic field axes arranged at an angle to one another between four poles. A longitudinal axis (A) is defined at right angles hereto by the centers of the quadrupole magnetic fields. At least one diamagnetic element (44) is arranged on the longitudinal axis (A). The first and second magnet assemblies (34, 36) are arranged relative to one another in such a way that the first and the second quadrupole magnetic fields are rotated towards one another about the longitudinal axis (A) by an angular amount which is not a whole-number multiple of 90°. Such a bearing arrangement can be used in particular in a magnetic levitation assembly (10) with a lifting assembly (26).

15 Claims, 3 Drawing Sheets

Figure 3:
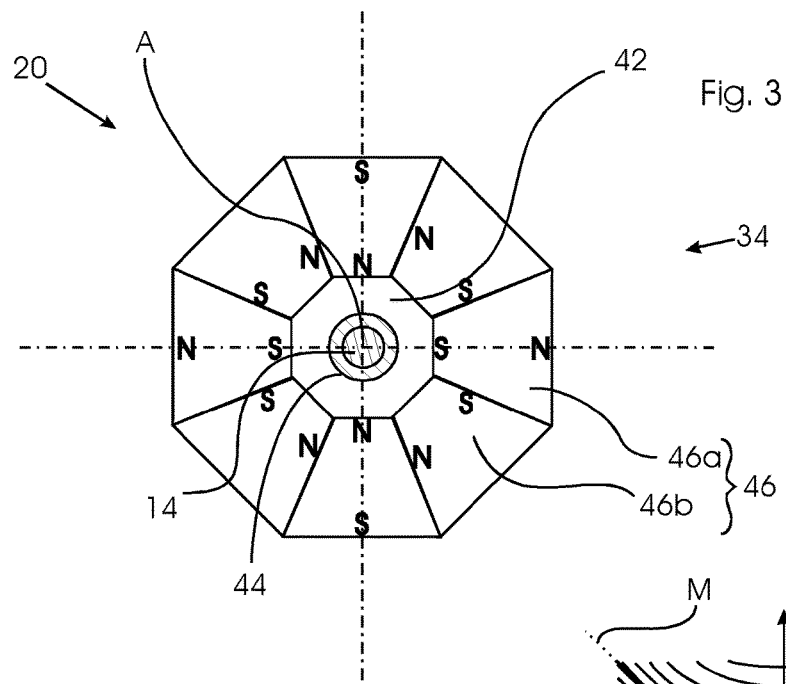

(51) Int. Cl.
*F16C 32/04* (2006.01)
*G01G 7/04* (2006.01)
(52) U.S. Cl.
CPC ................. *G01G 7/04* (2013.01); *H02K 7/09* (2013.01); *F16C 2202/40* (2013.01)
(58) Field of Classification Search
USPC ..................................................... 310/90–91
See application file for complete search history.

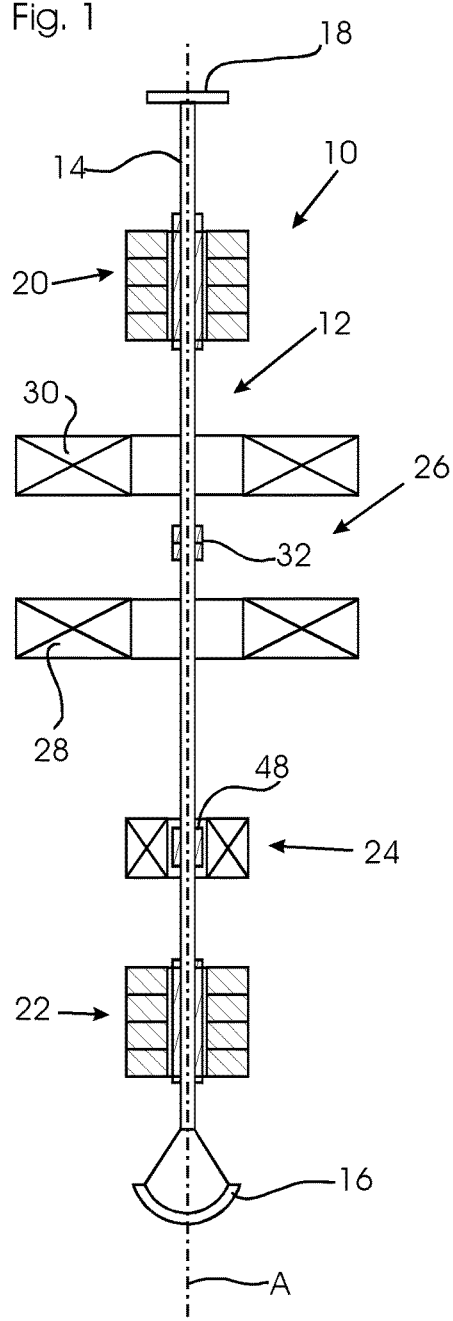
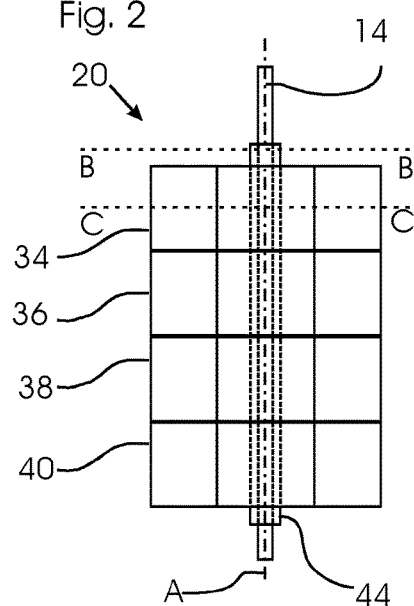

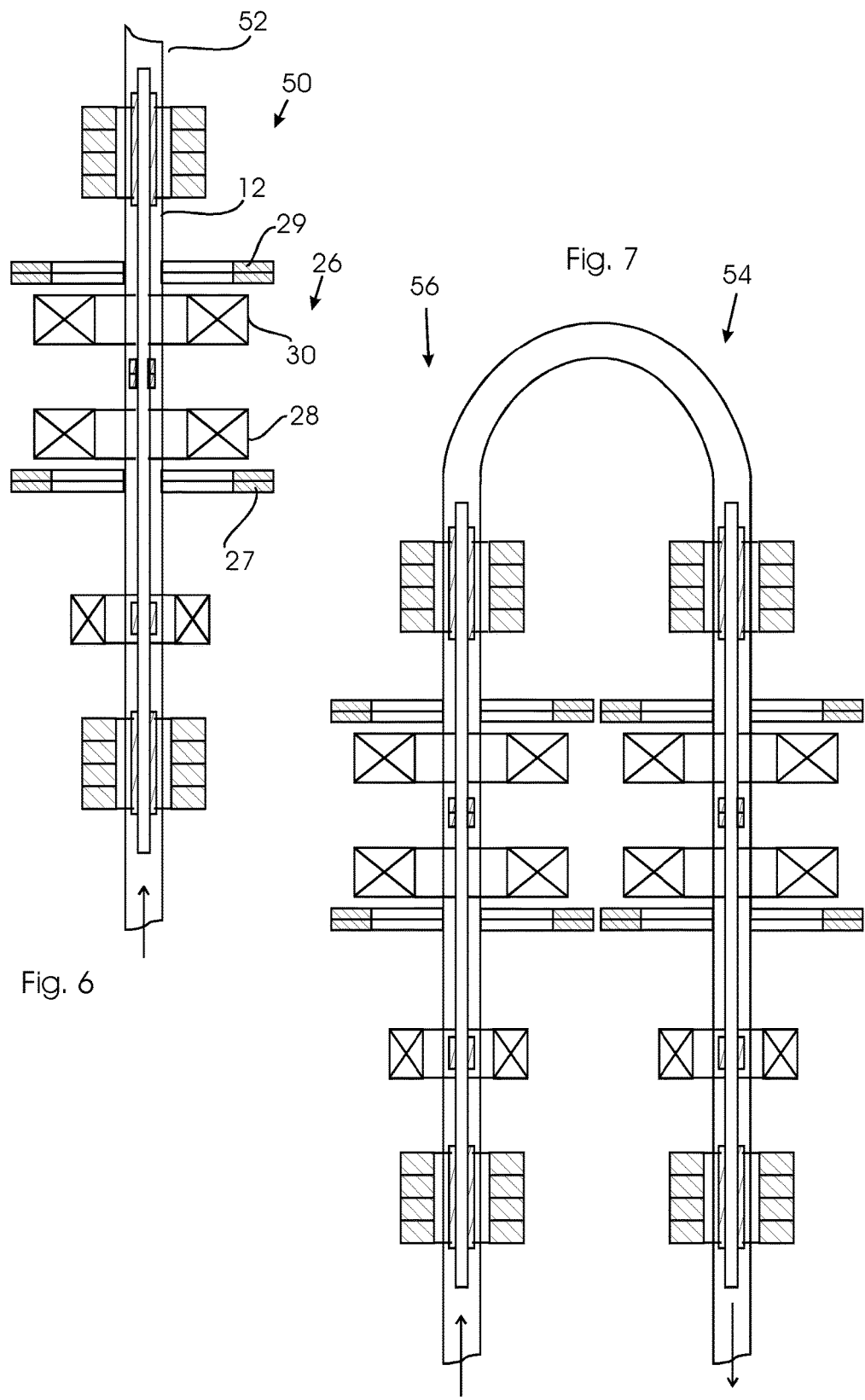

BEARING, IN PARTICULAR FOR A MAGNETIC LEVITATION ASSEMBLY

The invention relates to a bearing assembly, magnetic levitation assembly, and a method for the bearing mounting of an axle element. In particular, the invention relates to a magnetic levitation assembly and different aspects of magnetic levitation assemblies.

A magnetic levitation assembly as part of a magnetic levitation weighing scales device is disclosed, for example, in DE 10 2009 009 204 A1. This discloses a method and device for the levitation regulation of a levitation component, for example of a magnetic levitation weighing scales. The levitation component comprises a magnet element and a position sensor. An electromagnet is actuated in such a way that it exercises a force effect on the magnet element.

WO 2007/065608 A1 describes a magnetic levitation system. A dipole magnet is held in a two-dimensional or three-dimensional static quadrupole magnetic field. In a preferred embodiment, a closed control circuit of a servo-system with anti-Helmholtz coils is formed, in which the current is measured, which is proportional to the mass. In this situation, the dipole magnet is passive-stabilized by a diamagnetic material, which is embedded in a stabilizing magnetic field. The stabilizing magnetic field in which the diamagnetic material is located is preferably a quadrupole field.

The object of the invention can be seen as providing a bearing assembly and a method for the bearing mounting of an axle element, and a magnetic levitation assembly, with which good stabilization can be attained.

This object is solved according to a first aspect of the invention in accordance with claim 1, a magnetic levitation assembly equipped with this in accordance with claim 10, and a method for the bearing mounting of an axle element in accordance with claim 13. According to a second aspect of the invention, the object is solved by a magnetic levitation assembly in accordance with claim 14. According to a third aspect of the invention, the object is solved by a magnetic levitation assembly according to claim 15. In this situation, the three aspects of the invention are in each already advantageously ready for use alone, but are particularly suitable for combination.

With the bearing arrangement according to the invention and the method according to the invention for the bearing mounting of an axle element according to the first aspect of the invention, a first and a second magnet assembly are provided for the bearing mounting of a diamagnetic element on a longitudinal axis. The two magnet assemblies are in each case configured such as to produce quadrupole magnetic fields in first and second planes assigned to them, i.e. the first magnet assembly generates a first quadrupole magnetic field in a first plane and the second magnet assembly generates a second quadrupole magnetic field in a second plane. The first and second planes are arranged parallel to one another with a distance interval between them. A longitudinal axis, on which the diamagnetic element is arranged, runs at right angles to the planes, through the centres of the quadrupole magnetic fields.

With this arrangement, a contact-free and therefore frictionless mounting of the diamagnetic element by the quadrupole magnetic fields can be attained. Due to the diamagnetic properties, the diamagnetic element is centred on the longitudinal axis in the two quadrupole magnetic fields, arranged longitudinally behind one another. The diamagnetic element and each component located on this, such as an axle, shaft, levitation component, or another element, can therefore be mounted contact-free on the longitudinal axis. The mounting in this situation allows for free movement in the longitudinal direction. A frictionless rotation about the longitudinal axis is also possible. In particular, the bearing mounting can be configured in such a way that no forces take effect on the diamagnetic element in the longitudinal direction.

According to the invention, in this situation the first and second magnet assemblies are arranged relative to one another in such a way that the first and the second quadrupole magnetic fields are rotated to one another. In this situation the angle of rotation is a multiple of 90° which is not a whole number. The two quadrupole magnetic fields are therefore arranged parallel to one another in the longitudinal axis, but are arranged rotated against one another.

With a quadrupole magnetic field, magnetic field axes are produced in a plane between the four poles which are arranged at an angle to one another. The rotation of the quadrupole magnetic fields about an angle which is a multiple of 90° which is not a whole number therefore leads to an arrangement in which these magnetic field axes, seen in the longitudinal direction, are not flush, but are offset to one another. As a result, an especially good stabilizing of the dipole element is attained, the position of which, on the other hand, as the inventors have determined, under certain circumstances cannot be adequately stabilized in the direction of the magnetic field axes. Due to the rotated arrangement, bearing forces are exerted in total on the diamagnetic element which do provide for good centring and stabilizing on the longitudinal axis.

While in principle this effect is already attained with every angle value of the rotation which is greater than 0° and is a multiple of 90° which is not a whole number, it has in practice proved favourable if the rotation angular amounts, for example, to 5°-85°, preferably 10°-80°. With only two magnet assemblies, an angle of the rotation of 45°+/−20° or an odd-number multiple of these has proved especially favourable, since in that case the magnetic field axes of the quadrupole magnetic fields arranged longitudinally next to one another stand at a maximum angle to one another, such that the stabilizing effect is particularly perceptible. With more than two magnet assemblies arranged next to one another, angles of the rotation which are somewhat less are preferred, for example 10°-30°. With four magnet assemblies, for example, angles of the rotation of 10°-25° in each case are preferred.

Each magnet assembly can preferably be formed from a plurality of magnetic elements, for example of four or more, and preferably eight or more individual magnetic elements. The magnetic elements are preferably permanent magnetic elements. Preferably, in this situation magnetic elements with radially and/or tangentially aligned magnetization are provided, in order to generate the desired quadrupole magnetic field. For particular preference, the magnetization direction of the magnetic elements is such that no components point in an axial direction.

In this situation, any magnetic assembly can preferably comprise a plurality of magnetic segment elements arranged around the longitudinal axis. The magnetic segment elements can, for example, be arranged in ring form around a free centre. In this situation, magnetic segment elements are preferred which exhibit a trapezoidal form in cross-section.

According to a further embodiment of the invention, magnetic segment elements can be arranged in a Halbach array. With a Halbach array, segments of permanent magnets with different magnetic orientation are arranged directly next to one another in such a way that the magnetic flux is intensified to one side. With the ring-form Halbach array preferred here, the magnetizing directions are arranged in the form of a magnetic orientation rotating along the ring, in such a way that the magnetic flux is intensified in the centre.

In the situation of the use of magnet assemblies with magnetic segment elements, the rotation relative to one another can be attained, for example, by a flush arrangement of magnetic segment elements of both magnet assemblies, but with magnetic orientation between the magnet assemblies deviating from one another. Such an arrangement can be structurally simple. Preferably, the magnetic segment elements of both magnet assemblies are configured in such a way that they extend around the longitudinal axis by an angle range which is of equal size in each case. The angular amount of the rotation can then correspond to a whole-figure multiple of the angle range of a magnetic segment. With one preferred arrangement of, for example, eight magnetic segment elements, which in each case extend around the longitudinal axis over an angle range of 45°, an offset of the magnet assemblies to one another by one magnetic segment element results in a preferred angular amount of the rotation of, for example, 45°.

By means of the at least two magnet assemblies provided for according to the invention, an improved stabilizing of the diamagnetic elements is already attained. This can be improved still further in that, by means of a third magnet assembly, a third quadrupole magnetic field is generated in a third parallel plane, and, for further preference, by means of a fourth magnet assembly, a fourth quadrupole magnetic field is generated in a fourth parallel plane. It is also possible for further quadrupole magnetic fields to be arranged along the longitudinal axis. In this situation, quadrupole magnetic fields which are preferably arranged next to one another along the axis are in each case rotated against one another by an angular amount which is a multiple of 90° which is not a whole number, even if it is already sufficient for the attaining of the stabilizing effect if such a rotation occurs between two magnet assemblies, preferably arranged at a distance from one another, regardless of the alignment of magnet assembles arranged in between. With three or more magnet assemblies, and also with four or more magnet assemblies, preferably all the magnet assemblies are rotated in each case in pairs about an angular amount which is a multiple of 90° which is not a whole number. Accordingly, an offset is always provided between all magnetic field axes in the respective planes, such that the stabilizing effect is optimised.

The diamagnetic element can, for example, exhibit a cylindrical shape. In order to achieve weight savings, for example, it can be designed as short, exhibiting a length, for example, which is less than the distance interval between the first and second planes. According to a further embodiment of the invention, however, it exhibits a length which is greater than the distance interval between the first and second planes, i.e. the diamagnetic element extends along the longitudinal axis, through the planes of the two quadrupole magnetic fields. As a result, the situation can be attained that, even with a change of location in the longitudinal direction, no forces, only the lowest forces possible, take effect in this direction. In the situation with additional longitudinally-arranged quadrupole magnetic fields, it is further preferred for the diamagnetic element to extend along the longitudinal axis also through the respective parallel planes.

The bearing assembly described can be used in particular in a magnetic levitation assembly. In this situation, at least one first bearing assembly is provided for the mounting of a vertically oriented levitation element, i.e. the longitudinal axis is aligned vertically and the planes of the magnet assemblies are aligned horizontally. The diamagnetic is located on the vertically extending levitation element.

Further provided is at least one lifting assembly for the levitation element. This comprises at least one lifting magnet element arranged at the levitation element, preferably a permanent magnet element, which is magnetised vertically, i.e. in the longitudinal direction of the levitation element. The lifting assembly further comprises at least one lifting coil and/or one or more permanent magnet elements, in order to generate a lifting magnetic field, by means of which a lifting force is generated which takes effect on the lifting magnet element, and therefore on the levitation element.

The bearing assembly according to the invention is particularly well suited for use in such a magnetic levitation assembly. Due to the magnet assemblies taking effect horizontally, the levitation element is stabilized and centred in its vertical alignment. The bearing assembly can preferably be configured in such a way that no force is generated from this which takes effect in a vertical direction on the levitation element.

The lifting force taking effect in the vertical direction can be regulated in such a way that the levitation element is held levitated, i.e. in a fixed position in the vertical direction. This can be attained in particular by a regulation with a position sensor for the vertical position of the levitation element, with which, for example, one or more lifting coils are subjected to current.

Such a magnetic levitation assembly can be used in particular for measuring purposes, for example in a magnetic levitation weighing scales for measuring weight force, and therefore the mass of a sample taken from the levitation element, or for measuring other forces taking effect on the levitation element, which this experiences, for example, in a flowing medium.

Measurements, in particular of the weight force or of other forces taking effect on the levitation element, can be carried out, for example, by an external weighing cell, which is coupled to the lifting elements, i.e. to the lifting coil and/or the permanent magnet elements. Preferred, however, is a measurement of such forces by a measurement of the current through the lifting coil or coils.

In preferred embodiments, at least one lifting coil and/or at least one ring-shaped permanent magnet are arranged around the levitation element. For particular preference, two lifting coils and/or ring magnets are provided arranged axially at a distance from one another, between which the lifting magnet element is arranged. The lifting coils can in particular be subjected to current as anti-Helmholtz coils, in order to generate a suitable lifting magnetic field. Ring magnets are preferably magnetized in axially opposed directions, such that, preferably, a similar magnetic field to that of the lifting coils is generated. With a hybrid arrangement with lifting coils and permanent magnet elements, the field portions are overlaid and amplified in a preferred manner.

According to a further embodiment of the invention, with a magnetic levitation assembly at a distance from the first magnetic bearing assembly, a second bearing assembly can also be provided for, in such a way that the lifting assembly is arranged at least in part between the first and the second bearing assembly. In this way a preferably continuous levitation element can be well stabilized.

While in this situation the use of the special bearing assemblies according to the invention is preferred, with quadrupole magnetic fields rotated with one another, the arrangement of two magnetic bearings above and below the lifting assembly of a magnetic levitation assembly already also results in a stabilizing which is adequate for many purposes with the use of single quadrupole magnet assemblies. Accordingly, this second aspect of the invention according to claim 13 is also regarded as separately advantageous independently of the use of special bearing assemblies.

In a further preferred embodiment of a magnetic levitation assembly, the levitation element can be configured as a continuous rod of a ceramic material. In this situation it is preferred for at least one diamagnetic element located on the levitation element and/or the lifting magnet element provided at the levitation element to be configured in a ring shape, and to be arranged around the continuous rod. Such an arrangement has proved to be particularly suitable. Preferably, all the elements provided at the levitation element which take effect electrically or magnetically are configured in ring shape, and are arranged around a continuous ceramic rod, in particular the diamagnetic element of at least one first bearing assembly, and also the lifting magnetic element. For further preference, with the use of a second bearing, this also applies to the second diamagnetic element, as well as to a part of a position sensor arranged at the levitation element, such as an optical, electrical, or magnetic sensor.

This aspect of the structure of a magnetic levitation assembly does indeed also offer particular advantages in combination with the special bearing assembly according to the first aspect of the invention, and stabilizing by two bearings in accordance with the second aspect of the invention, but it is already advantageous when considered on its own. This third aspect of the invention according to claim 14 can therefore also be used independently of the special arrangement of the bearing assemblies according to the first aspect of the invention, and the use of two bearing assemblies arranged at a distance from one another in accordance with the second aspect of the invention.

Figure 4:
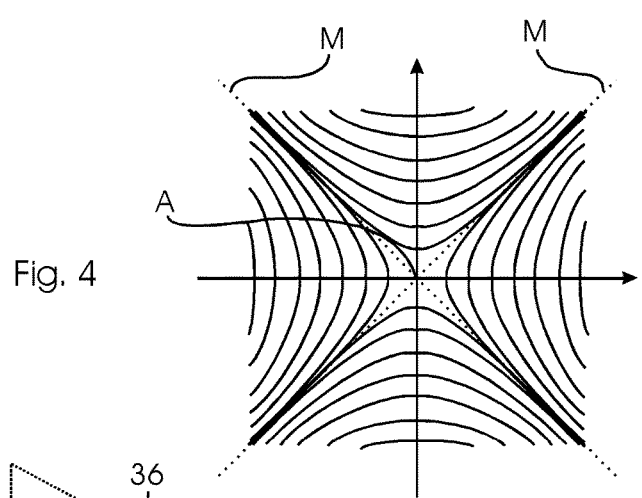
Figure 5:
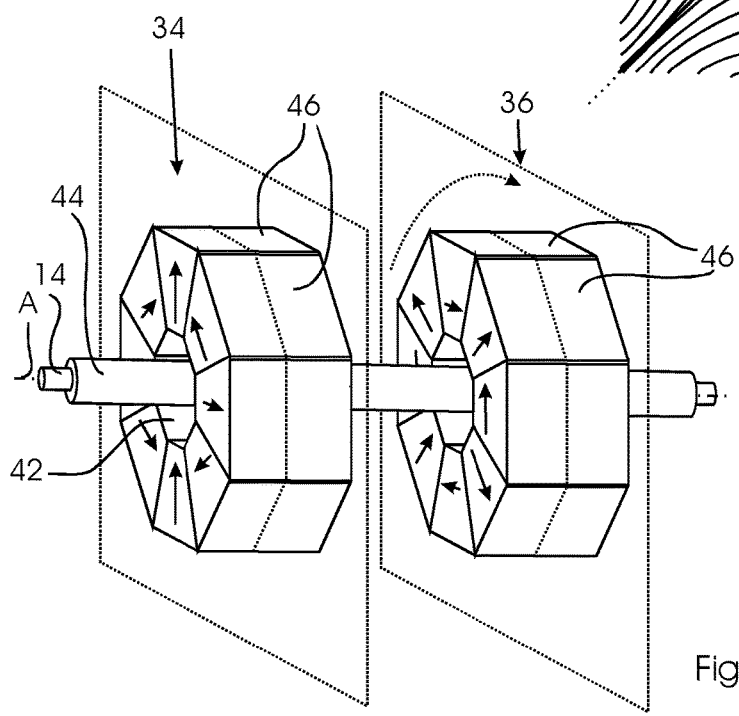

Exemplary embodiments of the invention are described in greater detail hereinafter on the basis of drawings. The drawings show:

FIG. 1 In a schematic representation, a longitudinal section through a magnetic levitation assembly of a magnetic levitation weighing scales;

FIG. 2 in a side view, a bearing assembly of the magnetic levitation assembly according to FIG. 1;

FIG. 3 a front view of a magnetic assembly of the bearing assembly from FIG. 2;

FIG. 4 a schematic representation of a quadrupole magnetic field of the magnetic assembly from FIG. 3;

FIG. 5 a schematic exploded representation of two magnet assemblies;

FIGS. 6,7 in a schematic representation of longitudinal sections, a first and a second embodiment of an arrangement for the measuring of flow forces.

FIG. 1 shows a longitudinal section through a magnetic levitation assembly 10. In this situation, the representation in FIG. 1 and in the following figures is to be understood as schematic in each case, with the aim of a clear understanding of the basic structure and of the most important components of the assembly, wherein actual devices comprise a plurality of further elements, such as housings, etc. In particular, the representations are not to scale.

The magnetic levitation assembly 10 comprises a vertically aligned levitation part 12, with a continuous longitudinal ceramic rod 14. The levitation part 12 is arranged freely levitating inside the stationary elements, which are described in individual detail hereinafter. In this situation, the magnetic levitation assembly 10 in the example shown is configured for use as a levitation weighing scales, with a sample taking device 16 under the casing represented by way of example, and a sample taking device 18 above the casing. The use of the magnetic levitation assembly 12 as a levitation weighing scales represents only one example, however; the assembly described hereinafter can in fact also be used for other purposes.

The magnetic levitation assembly 10 comprises an upper bearing 20 and a lower bearing 22, a position sensor 24, and a lifting assembly 26.

The lifting assembly 26 serves to hold the levitation part 12 in a desired vertical levitation position. For this purpose, its weight force is compensated by a counteracting magnetic force. By means of the sensor 24, the vertical position of the levitation part 12 is determined, such that the lifting assembly 26 can be regulated for the adjustment of the levitation location. In the example shown, the sensor 24 is an inductive sensor, with which the setting of an index element 48 at the levitation part 12 is determined contact-free, in relation to stationary sensor coils.

In the example shown, the lifting assembly 26 comprises two lifting coils 28, 30, which are arranged at a distance from one another, coaxially about the levitation element 12. Arranged between the lifting coils 28, 30, at the levitation part 12 is a magnetic dipole element 32, as the lifting magnet element. The lifting magnet element 32 is a ring-shaped permanent magnet element, arranged around the ceramic bar 14 of the levitation part 12, which is magnetised in the longitudinal direction of the levitation part 12.

The lifting coils 28, 30 are provided with a regulated current by an actuation device (not represented). In this situation they are connected and switched as anti-Helmholtz coils, and therefore generate a lifting magnetic field, which exerts a lifting force, counteracting the weight force, on the lifting magnet element 32, and therefore on the levitation part 12. The actuation device in this situation receives a position signal from the position sensor 24, and regulates the current through the lifting coils 28, 30 in such a way that a fixed levitation position is adopted and held; i.e. the weight force is exactly compensated.

For use as a magnetic levitation weighing scales, the current can then be measured through the lifting coils 28, 30. This is proportional to the weight force and therefore to the mass of the levitation part 12, such that the mass can be determined of the samples taken at the sample taking devices 16, 18.

In an alternative embodiment (not represented in FIG. 1), the lifting assembly 26 can comprise permanent magnet elements in addition to or as an alternative to the lifting coils 28, 30. Preferably, two ring-shaped permanent magnets, arranged axially at a distance from one another, are arranged in each case around the levitation element 12, located between which, at the levitation part 12, is the lifting magnet element 32. The ring-shaped permanent magnet elements are in this situation preferably opposite magnetised. A hybrid lifting assembly, with lifting coils and permanent magnets, is disclosed, for example, in WO 2007/065603 A1. Reference is expressly drawn to this with regard to the arrangement and formation of the permanent magnets and the lifting coils in relation to one another.

FIG. 6 shows a further example of such a hybrid lifting assembly, with, for example, two lifting coils 28, 30, and two permanent magnets 27, 29, with which the field strengths are preferably configured in such a way that the weight force of the levitation part 12 is already fully compensated by the lifting force of the permanent magnet elements 27, 29. In the event of weight changes, for example due to samples on the sample-taking devices 16,18 in FIG. 1, the additional weight force deriving from this can then be compensated by the lifting coils 28, 30.

In a further alternative arrangement (not represented), no lifting coils are provided for, but, by means of two magnet rings arranged at a distance from one another, as described heretofore, a purely passive magnetic bearing is formed. In this case, the sensor 24 is also not present, and no active position regulation takes place; instead, the levitation part 12 can, for example, be coupled to an external weighing cell.

The principle structure of a levitation arrangement as in FIG. 1, as well as details of its operation are described in WO 2007/065608 A1, to which reference should expressly be made in this respect. Accordingly, a more detailed description of the levitation function and its use as a levitation weighing scales will not be included. Instead, a number of important aspects of the structure of the magnetic levitation assembly 10 will be explained.

While the position of the levitation part 12 inside the magnetic levitation assembly 10 in the example represented in the vertical direction is, for example, actively regulated by the electromagnetic lifting assembly 26 (or, in the alternative embodiment described but not represented, the position of the levitation part in the vertical direction can also be held by a passive magnetic bearing), the bearings 20, 22 are provided in order to centre the levitation part 12 on a longitudinal middle axis. The bearings 20, 22 are, as can be seen from the following detailed description, magnetic bearings, which hold the levitation part 12 touch-free on the axis A. By way of the arrangement of two bearings 20, 22 at a distance from each other and, as shown, above and below the lifting assembly 26, good stabilizing of the levitation part 12 is achieved. In conjunction with the continuous rigid ceramic rod 14, the bearings 20, 22 enable incorrect positioning such as horizontal displacements or oblique settings to be avoided.

FIG. 2 shows a bearing 20 in a side view; in FIG. 3 the bearing 20 is represented in a view from above, with a cross-section though the levitation part 12 along the plane B.B in FIG. 2. As can be seen from the drawings, the bearing 20 comprises on the stationary side four vertical magnet assemblies 34, 36, 38, 40 above one another, with a continuous middle opening 42, in which the rod 14 of the levitation part 12 is accommodated.

Arranged in ring fashion around the rod 12 is a cylindrical ring-shaped element 44 made of diamagnetic material, such as graphite. The diamagnetic element 44, in the example shown is longer than the bearing 20, and extends through the magnet assemblies 34, 36, 38, 40. In an alternative embodiment (not shown), the diamagnetic element is axially substantially shorter than shown, in particular shorter than the axial distance interval of the middle planes of two adjacent magnet assemblies 34, 36, 38, 40.

The magnet assemblies 34, 36, 38, 40, of which the uppermost magnet assembly 34 can be seen in FIG. 3, are composed of magnetic segment elements 46. These are arranged in such a way that a powerful quadrupole magnetic field takes effect in the interior region 42.

In the example represented, the magnetic segment elements 46 form a Halbach array. With the arrangement represented, with eight segments, each of the magnet assemblies 34, 36, 38, 40 comprises eight magnetic segments 46 with trapezoidal cross-section. The magnetic segment elements 46 are arranged immediately next to one another, such that they form a ring around the longitudinal middle axis A, wherein each magnetic segment element 46 covers an angle region of 45° around the axis A.

The magnetizing direction of the magnetic segment elements 46 differs in this situation, as shown in FIG. 3, between magnetic segment elements 46 arranged next to one another in such a way that a rotating magnetizing is produced along the ring which is formed from these. For this purpose, the magnetic segment elements 46 comprise different types, namely magnetic segment elements 46a, 46c with radial magnetizing, and magnetic segment elements 46b, with tangential magnetizing. The radially magnetized magnetic segment elements 46a, 46c are magnetized radially opposed to one another, i.e. some comprise an inner south pole, and the others an inner north pole. The tangentially magnetized magnetic segment elements 46b are identical, but, as represented, are arranged in two different rotation positions. Magnetic segment elements 46a, 46b arranged in each case next to one another are of different types (radial/tangential magnetizing) and exhibit opposing magnetizing directions. Magnetic segment elements 46, in each case opposite one another, are of the same type (radial/tangential magnetizing), and likewise exhibit magnetizing directions which are opposed, i.e. rotated by 180° in the plane. As a result, a quadrupole magnetic field is produced in the free inner region 42 in a middle plane (represented as the plane C.C in FIG. 2).

A corresponding field distribution in the plane is represented schematically in FIG. 4. In this situation, a minimum field strength is created on the longitudinal middle axis A in the centre of the plane, such that the diamagnetic element 44 is centred at the rod 14 of the levitation part 12.

In the preferred arrangement, none of the magnetic segment elements 46 exhibits an axial magnetizing, such that no magnetic field components are present in the axial direction in the middle plane being considered in each case. Accordingly, a force effect is incurred on the diamagnetic element exclusively in the transverse direction but not in the axial direction. For example, with the use of the bearing in a levitation weighing scale, a falsification of the measurement result is therefore avoided.

It has transpired, however, that in the event of deflections of the diamagnetic element 44 out of the longitudinal middle axis A, the same resetting forces do not take effect at all points of the interior space 42. As can be seen from FIG. 4, magnetic field axes M can be defined between the four poles of the magnetic field in the middle plane of the magnet assembly 34. As has been shown, with a deflection along the axes M, the diamagnetic element 44 is set back to a lesser amount on the axis A than with a deflection in other directions.

Accordingly, the bearing 20 is configured with the four magnet assemblies 34,36, 38, 40 next to one another along the axis A in such a way that magnetic segment elements 34, 36, 38, 40 arranged adjacent to one another are provided not with the same magnetic orientation but rotated towards one another.

In FIG. 5 this is shown schematically in an exploded representation of two magnet assemblies 34, 36 arranged next to one another on the axis A. In this situation, for better understanding, the magnet assemblies 34, 36 are represented at a distance from one another, while, as can be seen from FIG. 2, they are preferably arranged axially directly next to one another.

As can be seen from FIG. 5, the rings of both magnet assemblies 34, 36, formed from the respective magnetic segment elements 46, exhibit in each case the same sequence of different magnetizings, but the second magnet assembly 36, represented on the right in FIG. 5, is rotated in a clockwise direction in relation to the magnet assembly 34, represented on the left, by a magnetic segment element 46 about the axis A. In the planes of the magnet assemblies 34, 36, represented in each case in FIG. 5 by dotted lines, there is accordingly the same field distribution in each case in the inner region 42 as in FIG. 4, but rotated against one another by 45° about the axis A.

In a view along the axis A, the respective field axes M of the magnetic fields taking effect in the planes of the magnet assemblies 34, 36, are therefore not flush, but offset against one another by 45°.

From this is derived a particularly good centring, due to the force effect of the two magnet assemblies 34, 36, provided next to one another, on the diamagnetic element 44 passing through.

In the example shown, the four magnet assemblies 34, 36, 38, 40 are in each case rotated by the angle region of a magnetic segment element 46, i.e. by 45°, against one another about the axis A. As a result, the magnet assemblies are flush, such that a simple structure is formed. Due to the offset of the respective magnetic fields in the middle planes, the diamagnetic element 44, and therefore the rod 14 of the levitation part 12, is well centred in the bearing 20, wherein, with deflection in the direction of the field axes M, a resetting and centring also take place.

However, with a rotation by 45° of magnet assemblies 34, 36, 38, 40 arranged in each case next to one another, a flush arrangement of the field axes is produced between the first and third magnet assemblies 34, 38, as well as between the second and fourth magnet assemblies 36, 40. A still better centring is achieved with an arrangement in which the field axes M of all four magnet assemblies 34, 36, 38, 40 are in each not flush in pairs, for example with a rotation towards one another in each case of 20°-25° of magnet assemblies 34, 36, 38, 40 arranged next to one another.

The lower magnetic bearing 22 of the magnetic levitation assembly 10 (FIG. 1) is of the same structure as the upper magnetic bearing 20. In both magnetic bearings 20, 22 in each case four magnet assemblies generate in each case quadrupole magnetic fields rotated against one another, by means of which the diamagnetic elements 44 are centred on the longitudinal axis A.

The diamagnetic elements 44 of both bearings 20, 22 are in this situation configured as ring elements or as circular cylindrical elements with middle boreholes, and are arranged about the continuous rod 14 of the levitation part 12. The lifting magnet element 32, and the index element 48 of the sensor 24, secured to the levitation part, are also in each case configured as ring-shaped or cylindrical respectively, with a middle borehole and arranged around the rod 14. In this way, the respective elements 32, 44, 48 can in each case be positioned exactly at the levitation part, and, due to the continuous rod 14, are sufficiently rigid to exclude deformations.

The explanation heretofore of the exemplary embodiment from FIGS. 1 to 5 is to be understood as only an example and not restrictive. Modifications in relation to the elements and arrangements shown are possible. For example, a magnetic bearing 20, 22 can exhibit a deviating number of magnet assemblies 34, 36, 38, 40, for example only two magnet assemblies rotated against one another, or more than the four magnet assemblies 34, 36, 38, 40 shown. The number of magnetic segment elements 46 can also deviate, as can the rotation angle of two magnet assemblies arranged next to one another. The lifting assembly 26 may have another coil arrangement, as well as, optionally, one or more permanent magnet elements in addition to or instead of the lifting coils.

As well as the use of the magnetic levitation assembly 10 as magnetic levitation weighing scales with sample taking devices 16, 18 as shown in FIG. 1, other uses are also possible. The magnetic levitation assembly 10 can be used universally as a measuring cell or highly sensitive force sensor for vertical forces, for example for the measurement of density, surface tension, flow, vapour pressure, viscosity, etc. FIG. 6 shows, for example, a magnetic levitation assembly 50 with the structure described heretofore, with which the levitation part 12 is arranged in a tube 52. As a deviation from the structure shown in FIG. 1, in this case the lifting assembly 26 is provided, in addition to the lifting coils 28, 30, with ring-shaped permanent magnet elements 27, 29, the magnetizing of which is dimensioned as dead load compensation, in such a way that it compensates for the weight force of the levitation part 12. Such a hybrid lifting assembly can also be used for other embodiments.

By detection of the forces, it is possible for a measurement to be carried out simultaneously of the flow speed and the density of the medium flowing in the tube 52. As shown in FIG. 7, two magnetic levitation assemblies 54, 56 can be provided at vertical sections of the same pipe, such that, with joint measurement, weight forces can be easily compensated. By the addition of the forces measured, with identically configured levitation parts, it is possible for the density to be measured, and by subtraction simultaneously of the flow force.

The invention claimed is:

1. Bearing assembly, comprising at least
one first magnet assembly for generating a first quadrupole magnetic field in a first plane, and a second magnet assembly for generating a second quadrupole magnetic field in a second plane, wherein the quadrupole magnetic fields comprise in each case in the planes magnetic field axes arranged at an angle to one another between four poles,
wherein the second plane is arranged parallel to the first plane, and a longitudinal axis at right angles to this is defined by the centres of the quadrupole magnetic fields,
and at least one diamagnetic element which is arranged on the longitudinal axis,
wherein the first and second magnet assemblies are arranged relative to one another in such a way that the first and the second quadrupole magnetic fields are rotated in relation to one another about the longitudinal axis by an angular amount which is not a whole-number multiple of 90°.

2. Bearing assembly according to claim 1, with which the first and the second quadrupole magnetic fields are rotated in relation to one another by 5° to 85°.

3. Bearing assembly according to claim 1, with which the first and/or the second magnet assemblies comprise a number of magnetic segment elements arranged around the centre.

4. Bearing assembly according to claim 3, with which the magnetic segment elements are magnetized in the tangential and/or radial direction.

5. Bearing assembly according to claim 3, with which the magnetic segment elements are arranged in a Halbach array.

6. Bearing assembly according to claim 3, with which the magnet segment elements are configured in such a way that they extend by an angle region of the same size about the longitudinal axis,
and the angular amount of the rotation corresponds to a whole-number multiple of the angle region of a magnet segment element.

7. Bearing assembly according to claim 1, with which
a third magnet assembly is provided for generating a third quadrupole magnetic field in a third plane, which is arranged parallel to the first and second planes.

8. Bearing assembly according to claim 7, with which
a fourth magnet assembly is provided for generating a fourth quadrupole magnetic field which is arranged parallel to the first, second, and third planes.

9. Bearing assembly according to claim 1, with which
the diamagnetic element exhibits a length which is greater than the distance interval between the planes.

10. Magnetic levitation assembly with
at least one first bearing assembly according to claim 1, wherein the planes are arranged horizontally and the diamagnetic element is located at a levitation element extending vertically,
and at least one lifting assembly, which comprises at least one lifting magnetic element arranged at the levitation element, and at least one lifting coil and/or one or more permanent magnet elements, in order to generate a lifting force taking effect on the levitation element.

11. Magnetic levitation assembly according to claim 10 with which
a second bearing assembly is provided at a distance from the first bearing assembly, with at least one magnet assembly for generating a quadrupole magnetic field, and at least one diamagnetic element in the centre of the quadrupole magnetic field,
wherein the lifting assembly is arranged between the first and the second bearing assemblies.

12. Magnetic levitation assembly according to claim 10 with which
the levitation element comprises a continuous rod of a ceramic material,
and at least one diamagnetic element and/or the lifting magnet element is configured in ring shape and is arranged around the continuous rod.

13. Method for mounting an axle element with which
at least one diamagnetic element is arranged on a longitudinal axis of a bearing,
wherein the bearing comprises a first magnet assembly for generating a first quadrupole magnetic field in a first plane and a second magnet assembly for generating a second quadrupole magnetic field in a second plane, wherein the quadrupole magnetic fields comprise in each case in the planes magnetic field axes arranged at an angle to one another between four poles,
wherein the first and second magnet assemblies are arranged relative to one another in such a way that the first and the second quadrupole magnetic fields are rotated in relation to one another about the longitudinal axis by an angular amount which is not a whole-number multiple of 90°.

14. Magnetic levitation assembly with
a levitation element extending vertically,
at least one first and one second bearing assembly, wherein the first and second bearing assemblies comprise in each case at least one magnet assembly for generating a quadrupole magnetic field and at least one diamagnetic element in the centre of the quadrupole magnetic field, wherein the diamagnetic element is located at the levitation element,
and least one lifting assembly, wherein the lifting assembly comprises at least one lifting magnetic element at the levitation element and at least one lifting coil and/or one or more permanent magnet elements, in order to generate a lifting force taking effect on the levitation element,
wherein the lifting assembly is arranged between the first and the second bearing assemblies.

15. Magnetic levitation assembly with
a levitation element extending vertically,
at least one first and one second bearing assembly, wherein the first and second bearing assemblies comprise in each case at least one magnet assembly for generating a quadrupole magnetic field and at least one diamagnetic element in the centre of the quadrupole magnetic field, wherein the diamagnetic element is located at the levitation element,
and at least one lifting assembly, wherein the lifting assembly comprises at least one lifting magnetic element at the levitation element and at least one lifting coil and/or one or more permanent magnet elements, in order to generate a lifting force taking effect on the levitation element,
wherein the levitation element comprises a continuous rod of a ceramic material,
and the diamagnetic element and/or the lifting magnetic element are configured as ring shaped and are arranged around the continuous rod.

* * * * *